United States Patent
Kishi

[11] Patent Number: 6,071,414
[45] Date of Patent: Jun. 6, 2000

[54] METHOD FOR DESALINATING SALTS-CONTAINING WATER AND APPARATUS THEREFOR

[75] Inventor: Masahiro Kishi, Takasago, Japan

[73] Assignee: Mechano Chemical Research Institute Ltd., Hyogo, Japan

[21] Appl. No.: 08/894,550

[22] PCT Filed: Mar. 22, 1996

[86] PCT No.: PCT/JP96/00744

§ 371 Date: Aug. 21, 1997

§ 102(e) Date: Aug. 21, 1997

[87] PCT Pub. No.: WO96/29142

PCT Pub. Date: Sep. 26, 1996

[30] Foreign Application Priority Data

Mar. 22, 1995 [JP] Japan .................................. 7-062953

[51] Int. Cl.[7] .......................... B01D 61/00; B01D 63/00
[52] U.S. Cl. .................. 210/652; 210/636; 210/333.01; 210/321.8; 210/321.78; 210/321.81; 210/437
[58] Field of Search ................. 210/321.78, 321.79, 210/321.87, 321.8, 321.9, 321.81, 636, 652, 500.23, 433.1, 333.01, 437, 446

[56] References Cited

U.S. PATENT DOCUMENTS

| | | |
|---|---|---|
| 4,219,426 | 8/1980 | Spekle et al. . |
| 4,451,369 | 5/1984 | Sekino et al. ........................ 210/321.9 |
| 4,781,834 | 11/1988 | Sekino et al. ....................... 210/321.88 |
| 4,923,609 | 5/1990 | Jardine ..................... 210/636 |
| 4,935,143 | 6/1990 | Kopp et al. ............................. 210/636 |
| 5,043,071 | 8/1991 | Anselme et al. . |
| 5,234,591 | 8/1993 | Darnell et al. ..................... 210/321.81 |
| 5,470,469 | 11/1995 | Eckman ............... 210/321.88 |
| 5,817,278 | 10/1998 | Fini et al. .......................... 210/321.81 |

FOREIGN PATENT DOCUMENTS

| | | |
|---|---|---|
| 52-138071 | 11/1977 | Japan . |
| 53-89077 | 8/1978 | Japan . |
| 53-142383 | 12/1978 | Japan . |
| 54-40232 | 12/1979 | Japan . |
| 55-122802 | 9/1980 | Japan . |
| 57-102201 | 6/1982 | Japan . |
| 58-190490 | 12/1983 | Japan . |
| 63-59312 | 3/1988 | Japan . |
| 1-119306 | 5/1989 | Japan . |
| 2-241522 | 9/1990 | Japan . |
| 4-260422 | 9/1992 | Japan . |

*Primary Examiner*—Ana Fortuna
*Attorney, Agent, or Firm*—Frishauf, Holtz, Goodman, Langer & Chick, P.C.

[57] ABSTRACT

The present invention relates to a method for desalinating brackish water or seawater by using a hollow fiber type reverse osmosis membrane, and an apparatus therefor, and an object thereof is to provide a novel method by which the lifetime of said reverse osmosis membrane can be prolonged and which is abundant in simplicity and economy, and an apparatus therefor. The present invention is a method for desalinating salts-containing water by using a hollow fiber type reverse osmosis membrane, which comprises using a vertically extending cylindrical reverse osmosis membrane apparatus, at the time of raw water supplying, supplying raw seawater to said reverse osmosis membrane apparatus without pretreatment, making said raw water flow from a core tube arranged along the center axis of said reverse osmosis membrane apparatus into a fiber layer of said reverse osmosis membrane apparatus through an inner circumferential space provided between said core tube and an inner circumferential surface of said fiber layer, and making said raw water flow out through an outer circumferential space provided between an outer circumferential surface of said fiber layer and an outer cylinder of said reverse osmosis membrane apparatus.

7 Claims, 7 Drawing Sheets

Section of a portion A

METHOD FOR DESALINATING SALTS-CONTAINING WATER AND APPARATUS THEREFOR

TECHNICAL FIELD

This invention relates to a method for desalinating brackish water or seawater by using a hollow fiber type reverse osmosis membrane, and an apparatus therefor.

BACKGROUND ART

Figure 5:
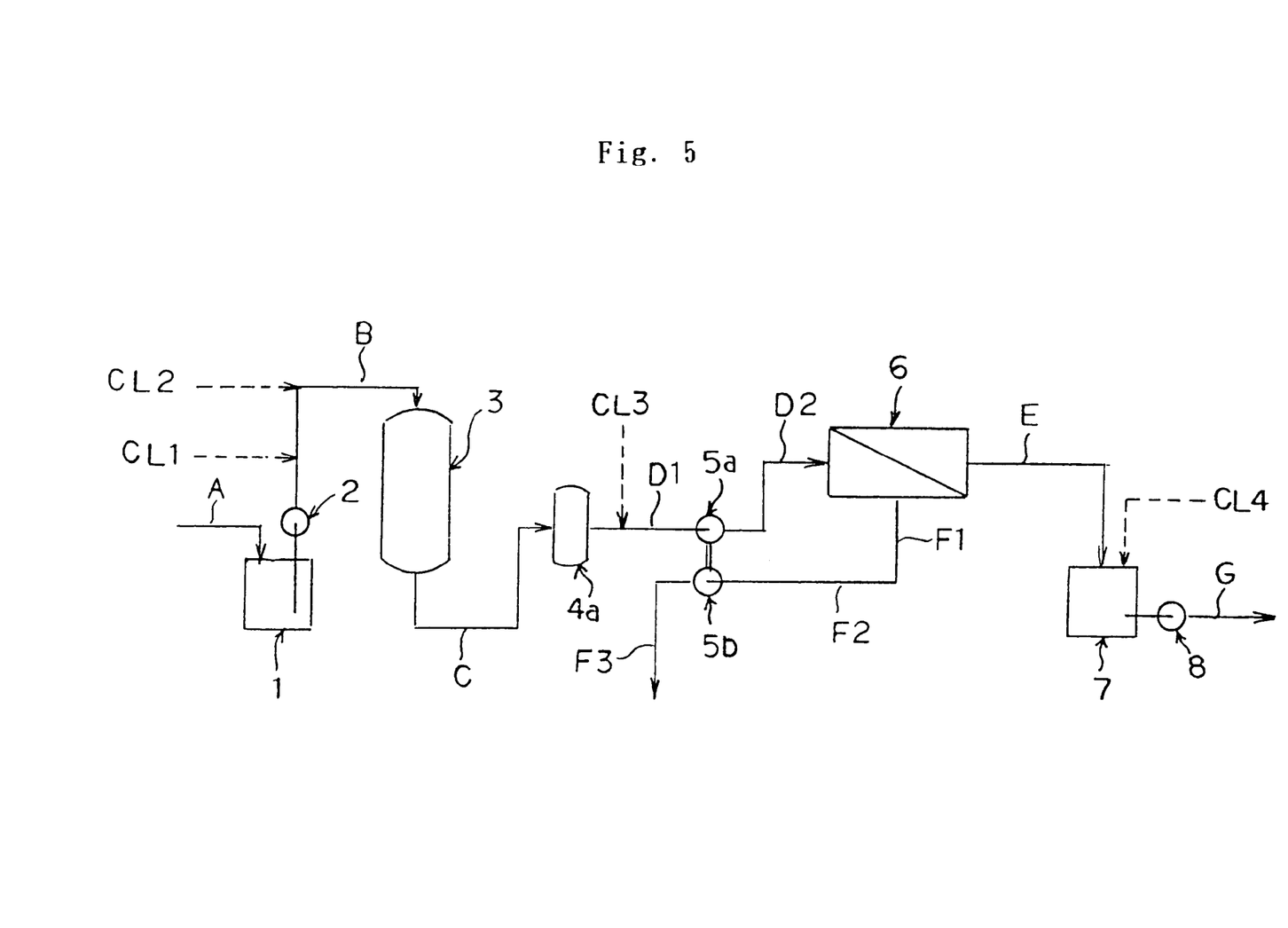
FIG. 5 is a diagrammatic view for illustrating a conventional system.

As shown in FIG. 5, in a conventional method for desalinating salts-containing water (hereinafter, description is made by taking the case of seawater unless otherwise indicated) by utilizing the reverse osmosis membrane method, there has generally been employed a system in which salts-containing water (hereinafter referred to as raw water) to be supplied to a reverse osmosis membrane apparatus: 6 is previously pretreated. Here, pretreatment refers to ① "filtration" treatment for removing suspended solid in raw seawater, which become a factor of increasing pressure loss of the reverse osmosis membrane apparatus: 6 (in general, said suspended solid is coagulated and made coarse by adding a chemical, for example, a coagulant: CL2 such as $FeCl_3$, etc. and then applied to a sand filter: 3), ② "prechlorination" treatment (This is to kill target microorganisms. In general, before the "filtration" treatment, a chemical, for example, $Cl_2$, NaClO, etc.: CL1 is added. Further, when a reverse osmosis membrane which is easily damaged by a chemical for prechlorination is used, it is necessary to add a chemical for reducing said chemical, for example, a reducing agent such as $NaHSO_3$, etc.: CL3.), etc. When such a pretreatment unit is integrated into a whole system, increase in initial cost (including the cost of a pretreatment apparatus itself as a matter of course and also the costs of a flow rate control valve for adjusting the treatment amounts of the pretreatment apparatus and the reverse osmosis membrane apparatus and their electricity and instrumentation) is caused as a matter of course, and not only increase in running cost (the cost of chemicals to be added and also the power cost of a pump: 2 for overcoming the resistance of the pretreatment apparatus itself and the resistance of a flow rate control valve (not shown in the figures) provided on a line: C) but also increase in manufacturing cost of produced water are caused.

Further, in the above pretreatment, the suspended solid in the raw water and floc of the coagulant: CL2 added for coagulating said suspended solid and making them coarse captured in a filter medium should be discharged periodically to the outside of the system. In the aspect of protecting environment, these should be treated as wastes.

When the pressure loss of the reverse osmosis membrane apparatus: 6 exceeds a predetermined value, production of fresh water is temporarily stopped, and said reverse osmosis membrane apparatus is cleaned up. Such cleaning is carried out by using a cleaning unit provided separately from the system for producing fresh water shown in FIG. 5 and circulating a cleaning liquid containing ammonium citrate or an organic detergent from said cleaning unit through a course of a line: D2→said reverse osmosis membrane apparatus (a raw water side)→a line: F1 by using an exclusive pump. In this cleaning system, separately from the system for producing fresh water, not only the cleaning unit should be provided, but also an exclusive cleaning liquid should be prepared. This point is also a factor of increasing the cost of the whole system. The effect bought about by such cleaning is exerted only on substances which are dissolved in the cleaning liquid, such as a metal hydroxide, etc.

Further, as a novel cleaning method, there have been also proposed methods of making fresh water flow backward from a treated water side to a raw water side by utilizing a positive osmotic phenomenon (Japanese Patent Publication No. 40232/1979, Japanese Provisional Patent Publication No. 59312/1988 and Japanese Provisional Patent Publication No. 119306/1989). However, in these proposals, backward flowing of fresh water is utilized merely as physical peeling force of fine particles adhered to a membrane surface, and the cleaning effects thereof are not sufficient.

DISCLOSURE OF THE INVENTION

The present invention has been made for the purpose of providing a simple and economical method for desalinating salts-containing water such as brackish water and seawater, in which the above problems in the prior art are solved, and an apparatus therefor.

The present inventor has carefully studied and inspected not only the factor of pressure loss of a whole system as a matter of course but also the factor of lowering performance including increase in pressure loss of a reverse osmosis membrane apparatus to accomplish the present invention.

Firstly, as the factor of pressure loss of a whole system, the resistance of a pretreatment apparatus itself and the resistance of a flow rate control valve provided between the pretreatment apparatus and a reverse osmosis membrane apparatus cannot be ignored, so that these facilities are tried to be omitted.

According to a conventional way of thinking, it has been considered that if pretreatment is omitted, troubles including increase in pressure loss of the reverse osmosis membrane apparatus are caused. However, it has been found that when a mechanical contrivance is applied to the reverse osmosis membrane apparatus and a good working of the reverse osmosis membrane apparatus is considered, pretreatment is not indispensable.

That is, the present invention is a method for desalinating salts-containing water by using a hollow fiber type reverse osmosis membrane, which comprises using a vertically extending cylindrical reverse osmosis membrane apparatus, at the time of raw water supplying, supplying raw water to said reverse osmosis membrane apparatus without pretreatment, making said raw water flow from a core tube arranged along the center axis of said reverse osmosis membrane apparatus into a fiber layer of said reverse osmosis membrane apparatus through a space provided between said core tube and an inner circumferential surface of said fiber layer, and making said raw water flow out through a space provided between an outer circumferential surface of said fiber layer and an outer cylinder of said reverse osmosis membrane apparatus.

The troubles of a reverse osmosis membrane which have been estimated in the case of omitting pretreatment are as described below.

Figure 6:
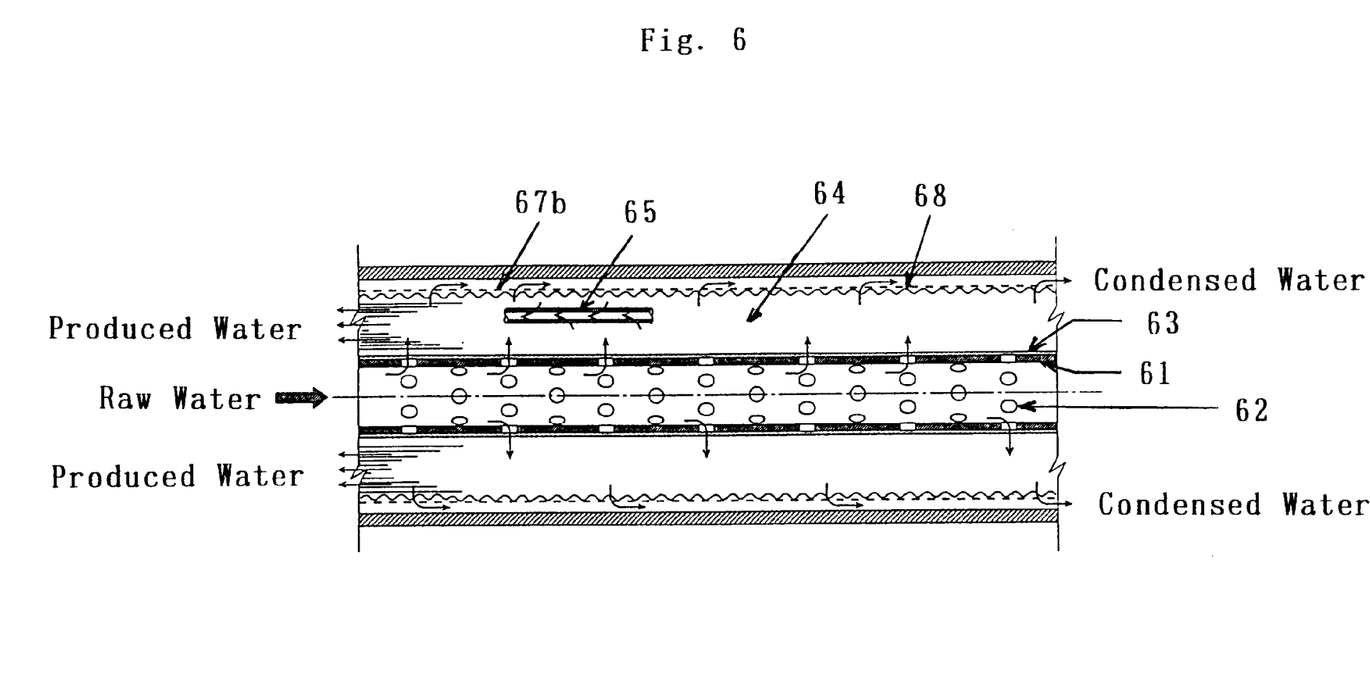
FIG. 6 is a partial enlarged sectional view for schematically showing the relation between a core tube and a fiber layer of a conventional reverse osmosis membrane apparatus.
Figure 7:
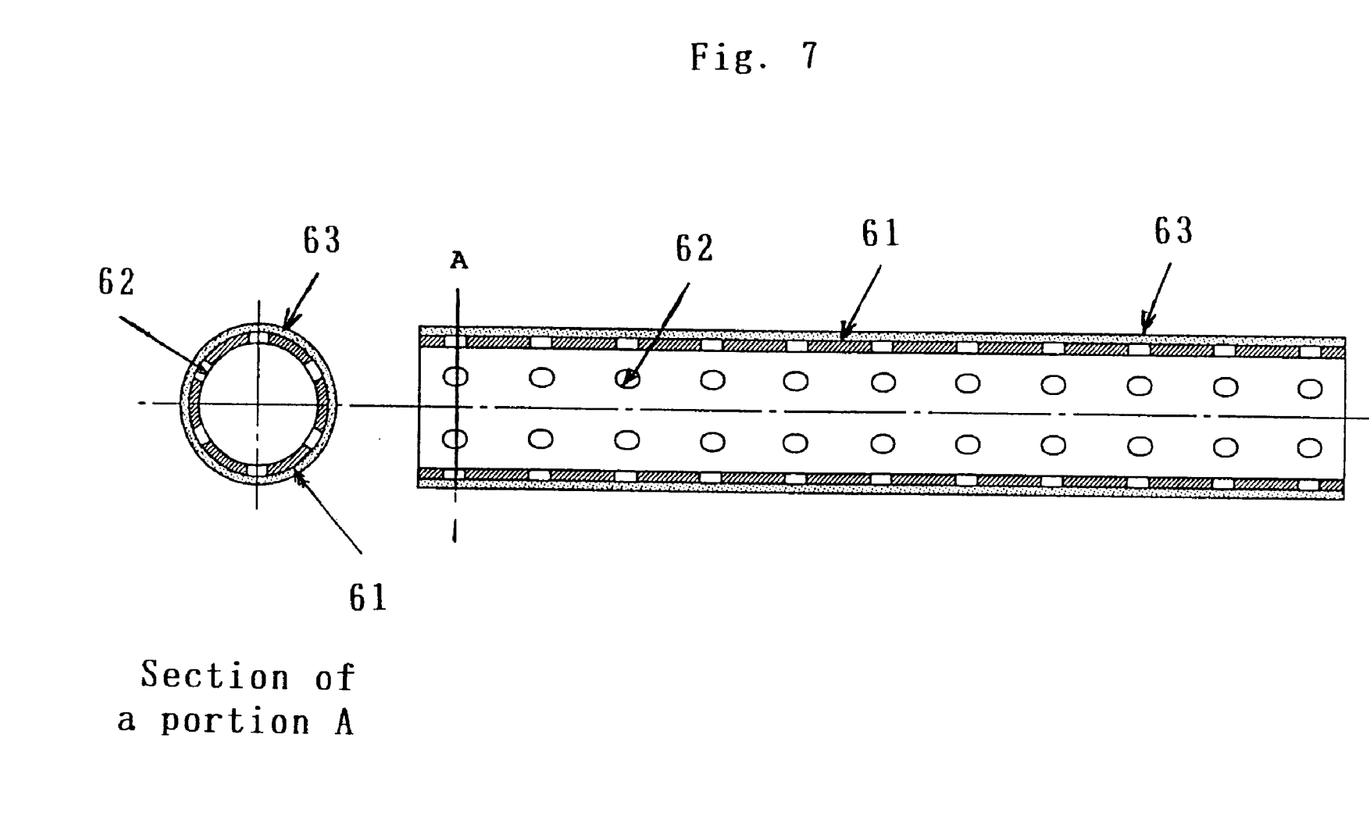
FIG. 7 is an enlarged sectional view of one part of the apparatus shown in FIG. 6.

① As shown in FIG. 6 and FIG. 7, in a conventional reverse osmosis membrane apparatus, an inlet portion of a fiber layer (since hollow fiber type reverse osmosis membranes are used, hereinafter, each membrane is referred to as "the fiber: 65" and gathering of them is referred to as "the fiber layer: 64") touches an outer circumferential surface of a core tube: 61 through an inner screen: 63. Therefore, at the inlet portion of said fiber layer, i.e., an outlet portion of through holes: 62 (hereinafter referred to as "the holes") of raw water piercing said core tube, relatively coarse particles are captured to choke said portion. As a result, flow passage resistance is increased (most of pressure loss of a reverse osmosis membrane apparatus itself is caused by this factor) and also drift current is generated to cause lowering of performance. When the flow velocity of passing the holes: 62 is lowered, the possibility of generation of choking at said portions can be reduced. However, the whole opening area of said holes should be enlarged therefor, whereby the strength (strength against deflection) of the core tube: 61 to which the pressure of supplying raw water is applied is lowered, which is unpractical.

② When operation is continued for a long time, fine particles start to be gradually accumulated in the fiber layer, and accumulated fine particles become resistance to lower the efficiency of desalination (produced water amount/raw water amount). As a matter of course, pressure loss is also increased.

③ Fine particles entering into the fiber layer when water permeates the fiber are deposited on the surface of the fiber to form a gel layer. The gel layer becomes resistance to lower the efficiency of desalination, or concentration polarization is generated to increase the amount of a salt permeated to a treated water side. As a matter of course, pressure loss is also increased.

④ In the above gel layer, microorganisms start to proliferate, and among them, microorganisms living in the vicinity of the surface of the fiber are not killed completely even by $Cl_2$ or $NaClO$ which has conventionally been injected into raw water for prechlorination. Therefore, said microorganisms themselves and/or secretions thereof become a binder, and said deposited fine particles are firmly adhered to the surface of said fiber. As a result, the trouble of the above ③ is amplified.

⑤ The fiber itself is damaged by the above bacteria, etc.

In the present invention, these troubles have been coped with by employing the following measures.

Measure against the trouble ①

A space: 67a (hereinafter referred to as the inner circumferential space) is provided between the fiber layer: 64 (accurately, the inner screen: 63) and the core tube: 61 of the reverse osmosis membrane apparatus: 6, raw water coming from the holes: 62 is once introduced into this inner circumferential space and made to flow into said fiber layer uniformly and at a low flow rate (preferably 1 to 5 mm/sec) through said space. Here, the above inner circumferential space: 67a is necessarily formed by providing plural ribs: 66 extending in the axis direction of the core tube: 61 on the outer circumferential surface of said core tube. That is, the inner circumferential surface of the fiber layer: 64 touches the upper ends of the above ribs through the inner screen: 63 (see FIG. 2 and FIG. 3). The whole opening area of the holes: 62 may be smaller than that of a conventional method, and the holes: 62 are arranged locally at the upper portion and the lower portion of the core tube: 61 (as a result, not only dispersion of raw water in the axis direction of the core tube in the inner circumferential space: 67a is accelerated, but also, coupled with provision of the ribs, lowering of the strength of the core tube itself can be avoided). When the whole opening area of the holes is made small, the pressure loss of the hole portions is enlarged as a matter of course. However, flowing of raw water into the fiber layer: 64 becomes uniform and is carried out at a low flow velocity, so that the possibility of generation of choking at said portions is lowered remarkably. Therefore, the enlarged pressure loss can be ignored when it is compared with the pressure loss which is reduced as a result.

The apparatus of the present invention extends vertically, i.e., the above core tube is provided perpendicularly, and raw water is made to flow along the axis line of said core tube (flowing may be in either direction of downward or upward), so that particles flowing of which is interrupted by the inner screen: 63 and the inner circumferential surface of the fiber layer: 64 (irrespectively of the direction of making raw water flow) and coarse particles having a rapid sedimentation velocity (only in the case of making raw water flow downward) are accumulated at the lower portion of the flowing direction of the inner circumferential space: 67a and said core tube. However, the former trouble can be coped with by back washing and air washing of the fiber layer: 64 described below (mechanical consideration, i.e., concentrated arrangement of the holes: 62 at the upper and lower portions of the core tube: 61 is also effective in the point of being capable of using the inner circumferential space: 67a as a passage for conveying said accumulated particles). The latter trouble may be coped with by discharging said accumulated particles by the water pressure of raw water from a pipeline (with a valve) for drainage provided at said lower portion to the outside of the system or to a line of condensed water (said valve is always "open").

If necessary, raw water supplying to the reverse osmosis membrane apparatus: 6 is stopped, and raw water or condensed water is made to flow to the raw water side of the reverse osmosis membrane (the outer side of the fiber: 65) in a direction reverse to the direction at the time of raw water supplying to wash the fiber layer: 64 of said reverse osmosis membrane apparatus (hereinafter, this operation is referred to as back washing). Since this trouble is mere adhesion of the fine particles to the fiber, said fine particles can be easily removed by back washing. The frequency of back washing may be determined suitably depending on the water quality of raw water, but since it is effective to take a measure against this kind of trouble sooner, it is preferred to carry out back washing about once in several days.

Measure against the trouble ②

Since the inner space of the fiber layer: 64 is sufficiently large, generation thereof is slow as compared with the troubles ① and ③. Therefore, it is necessarily solved by taking measures against the troubles ① and ③.

Measure against the trouble ③

When the measure (back washing) against the above trouble ①, which also serves as the measure against the trouble ④, is taken, surface washing of the fiber: 65 of said reverse osmosis membrane apparatus is carried out by supplying produced water to which $Cl_2$ or $SO_2$ is added or produced water to which $CO_2$ together with $Cl_2$ or $SO_2$ are added, to the treated water side of the reverse osmosis membrane (the hollow portion of the fiber: 65) in a direction reverse to the direction at the time of raw water supplying. Since $Cl_2$, $SO_2$ and $CO_2$ are gaseous substances, they easily permeate the reverse osmosis membrane.

Therefore, by said gaseous substances which permeate the reverse osmosis membrane from the treated water side to the raw water side, microorganisms living in the vicinity of the surface at the raw water side of said fiber are firstly deteriorated and then killed (therefore, at the time of raw water supplying, sterilization of raw water is not necessary). As a result, adhesion to the membrane surface of the gel layer is lost, and then by the positive osmotic phenomenon of produced water (by making condensed water flow to the raw water side of the reverse osmosis membrane, sufficient osmotic pressure can be obtained even if salts-containing water is brackish water), said gel layer is peeled off from the membrane surface. This peeled gel layer is carried away with raw water or condensed water which flows backward, and rapidly discharged to the outside of the system. Here, $SO_2$ is effective when a reverse osmosis membrane which is easily damaged by $Cl_2$ is used in the reverse osmosis membrane apparatus: 6. When scales of $CaCO_3$, etc. exist, $CO_2$ functions as a dissolving agent thereof. As a matter of course, by taking the measure against the trouble ③, the troubles ④ and ⑤ are also canceled.

Further, in the present invention, in addition to the above respective measures, washing with air (hereinafter referred to as air washing) of the fiber layer: 64 is carried out (in a horizontally extending reverse osmosis membrane apparatus, this operation cannot be carried out) for effecting complete washing. Specifically, after the above back washing using positive osmosis in combination, at a suitable point of an air washing step, water retained in the module of the reverse osmosis membrane apparatus: 6 is once drained. Thereafter, while condensed water is supplied to the raw water side of said reverse osmosis membrane apparatus in a direction reverse to the direction at the time of raw water supplying, air is fed from the lower portion of the fiber layer: 64. Then, since the apparatus of the present invention extends vertically, the vicinity of the water surface which moves upward in the module of the reverse osmosis membrane apparatus: 6 becomes a gas-liquid mixed stream which flows vigorously, and the fiber layer: 64 pulsates. Therefore, the particles adhered to the surface of each fiber in said fiber layer are peeled off from said fiber upward, in order and easily. Here, for the purpose of preventing the air for washing from directly blowing upward through an outer circumferential space: 67b of the reverse osmosis membrane apparatus: 6, in said outer circumferential space, at least two spacers: 69 which can close a flow passage thereof are arranged at predetermined intervals in the axis direction of said reverse osmosis membrane apparatus. In order to prevent the fiber: 65 from being dried and utilize the force of peeling the adhered particles by the positive osmotic phenomenon effectively, during this step, supply of produced water to which $Cl_2$ or $SO_2$ is added or produced water to which $CO_2$ together with $Cl_2$ or $SO_2$ are added, to the treated water side of the reverse osmosis membrane is continued (as a result, said surface of said fiber is always in a wet state, so that the adhered particles are easily slid downward). In water retained in the reverse osmosis membrane apparatus: 6 after completion of air washing, a large amount of the peeled particles are contained, so that after said retained water is once drained to the outside of the system, the above back washing using positive osmosis in combination is carried out again to wash away the peeled particles remaining in the reverse osmosis membrane apparatus: 6.

BEST MODE FOR PRACTICING THE INVENTION

In the following, the present invention is explained in detail by referring to the drawings.

Figure 1:
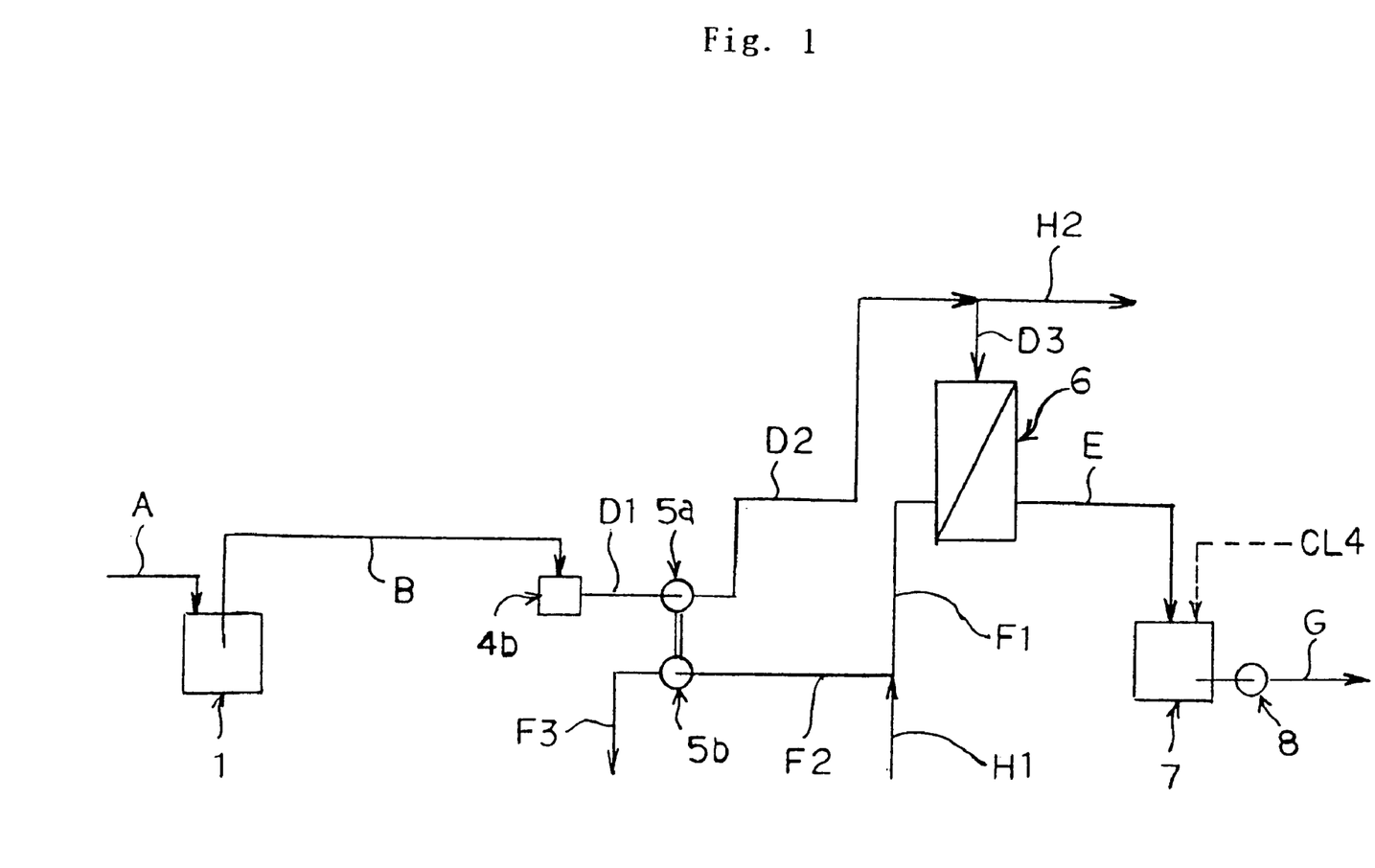
FIG. 1 is a diagrammatic view for illustrating one embodiment apparatus in the method of the present invention.

In FIG. 1, the basic flow (a flow for a fundamental purpose of obtaining fresh water from salts-containing water, i.e., a flow at the time of raw water supplying) of the present invention is shown. Here, the reference numeral 1 is a raw water-storing tank, 4b is a strainer, 5a is a high pressure pump, 5b is a recovery turbine, 6 is a reverse osmosis membrane apparatus, 7 is a produced water-storing tank, 8 is a produced water pump, A to H are lines, respectively, and CL4 is a chemical for postchlorination (for the purpose of sterilizing produced water) such as $Cl_2$, NaClO, etc.

In the method of the present invention, salts-containing water (raw water) to be treated is supplied to the reverse osmosis membrane apparatus: 6 without carrying out pretreatment such as "sand filtration", etc. However, in order to prevent the flowing of foreign matters by which physical damages of the high pressure pump: 5a and the reverse osmosis membrane apparatus: 6 are brought about, the strainer: 4b is provided before the high pressure pump: 5a (in order to ensure safety of the apparatus, a microfilter may be further provided). The flow at the time of raw water supplying is shown below by way of lines.

Figure 2:
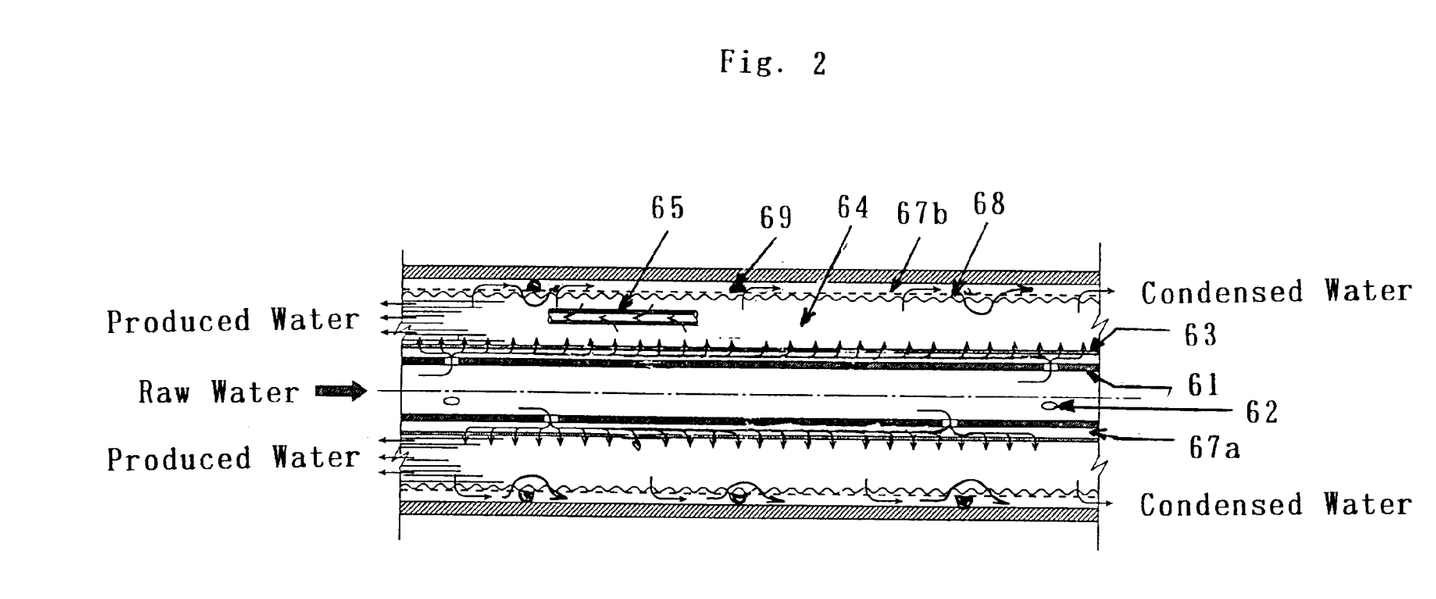
FIG. 2 is a partial enlarged sectional view (cut along the axis line of a core tube) for schematically showing the relation between a core tube and a fiber layer of a reverse osmosis membrane apparatus which is one embodiment apparatus of the present invention.
Figure 3:
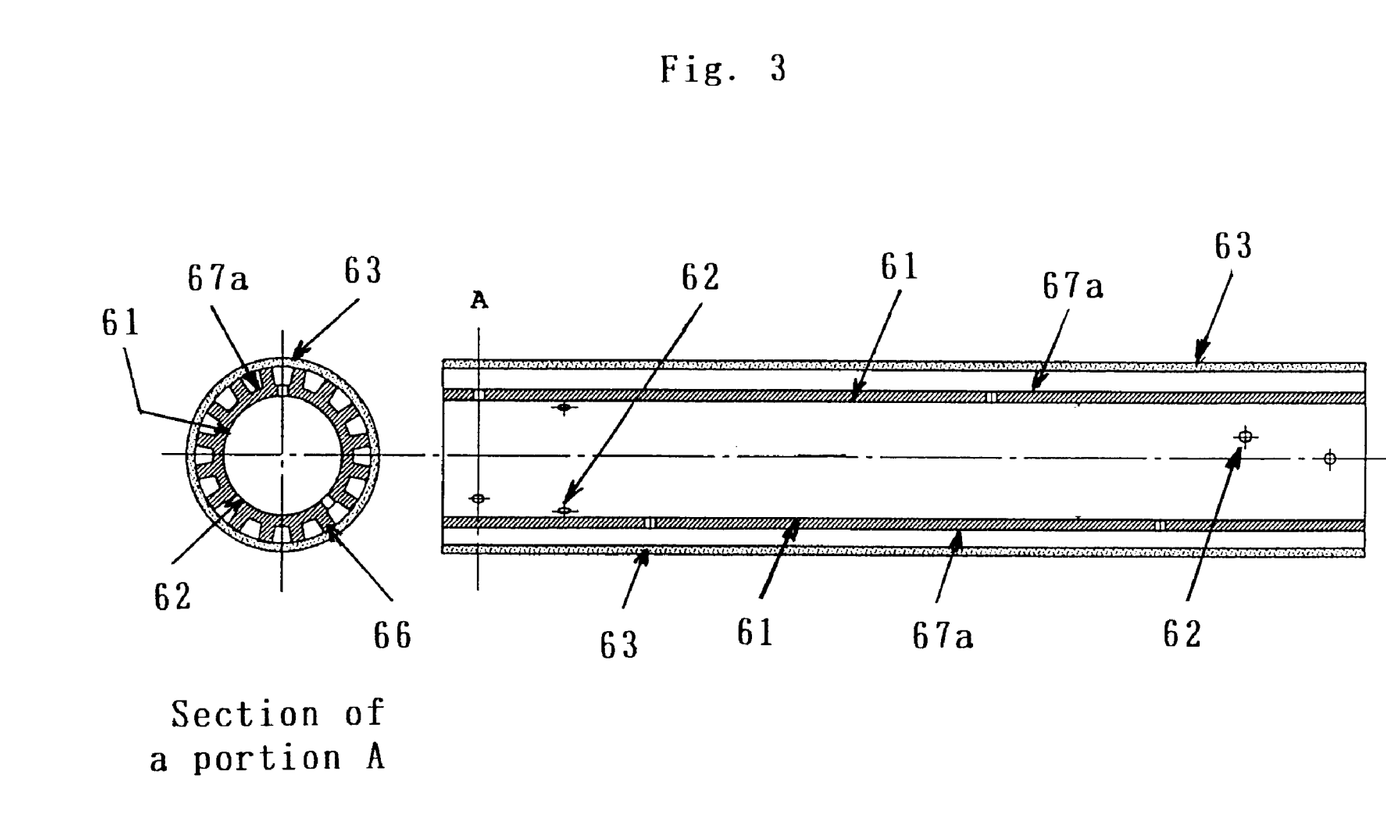
FIG. 3 is an enlarged sectional view of one part (the core tube and the inner circumferential space) of the apparatus shown in FIG. 2.
Figure 4:
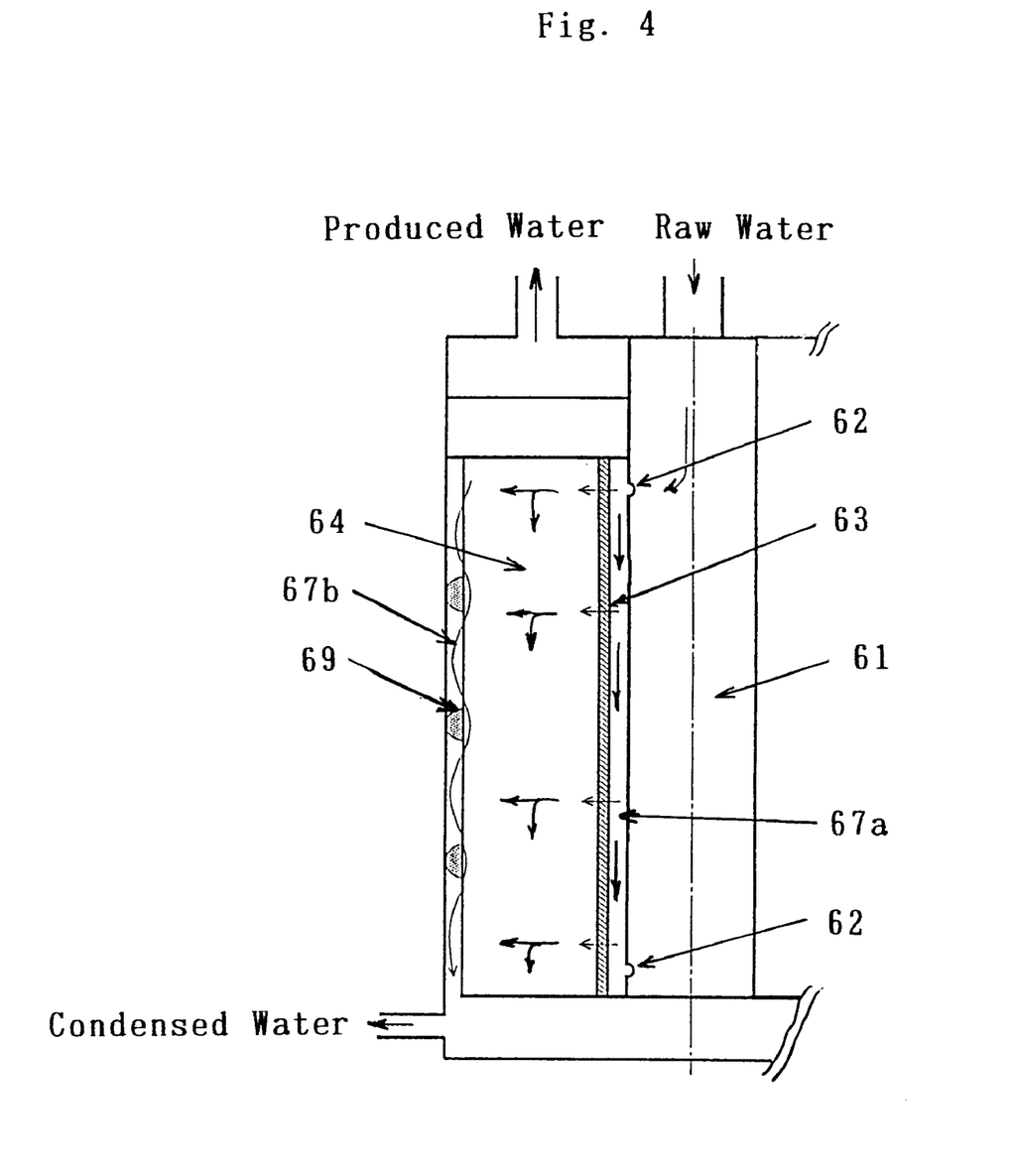
FIG. 4 is a sectional view (only one side of a fiber layer is shown) for schematically showing the flow of water in a module of a reverse osmosis membrane apparatus which is one embodiment apparatus of the present invention.

The apparatus of the present invention has the structures shown in FIG. 2 and FIG. 3. As clearly seen when compared with FIG. 6 and FIG. 7, the apparatus of the present invention extends vertically (The conventional apparatus extends horizontally. While the left side in the longitudinal direction is left and the right side in the same direction is right in FIG. 6 and FIG. 7, the left side in the longitudinal direction is an upper part and the right side in the same direction is a lower part in FIG. 2 and FIG. 3). Further, in the apparatus of the present invention, a main different point resides in that an inner circumferential space: 67a is provided between a core tube: 61 and a fiber layer: 64 (accurately, an inner screen: 63), and, holes: 62 through which water can be passed are provided locally at the upper portion and the lower portion of the wall of said core tube. Most of the raw water pressurized by the high pressure pump: 5a to be introduced into the axis direction of the core tube: 61 (pressure: about 65 kg/cm$^2$) enters into the inner circumferential space: 67a through the holes: 62 at the upper portion, and while flowing downward in said inner circumferential space (a part thereof flows downward in said core tube and then enters into the inner circumferential space: 67a through the holes: 62 at the lower portion), the raw water flows into the whole inner circumferential surface of the fiber layer: 64 at a slow flow velocity through the inner screen: 63. Most of the raw water is desalinated while flowing in the radius direction (a part thereof flows in the axis direction of the core tube: 61). Produced water flows out from the upper portion of the reverse osmosis membrane apparatus: 6 through the hollow portion of the fiber: 65, and condensed water enters into an outer circumferential space: 67b from an outer screen: 68 and flows out from the lower portion of said reverse osmosis membrane apparatus (See FIG. 4. Here, the apparatus is shown by taking the case of an embodiment that raw water is made to flow downward in the core tube: 61.). Raw water supplying to the reverse osmosis membrane apparatus: 6 which is continuously operated for a predetermined time is stopped, and washing operation is carried out (The operation is explained by dividing it into steps. The following numbers show the order of the steps.).

(1) Back washing

In a course where the high pressure pump: 5a, the recovery turbine: 5b and the resistances of a back pressure valve, etc. (not shown in the figures) provided on the line: F3 are bypassed, i.e., lines: H1→F1→D3→H2 (The lines merely show a route of flow, and the lines are not necessarily common in actual line arrangement. Hereinafter the same.), raw water or condensed water is made to flow to wash the inner space and the inlet portion of the fiber layer: 64 (by utilizing a washing pump—not shown in the figures—provided separately). Here, in the condensed water, particles which have passed through the fiber layer: 64 at the time of raw water supplying are contained, so that in order to prevent said particles from flowing into the fiber layer again, a cartridge filter (not shown in the figures) is provided at the outlet of the washing pump.

Simultaneously, produced water stored in the produced water-storing tank: 7 is supplied to the treated water side of the reverse osmosis membrane apparatus: 6 (the hollow portion of the fiber: 65) by the produced water pump: 8 through the line: E [the measures against the troubles ③ to ⑤]. Since high hydraulic pressure at the time of raw water supplying is not applied at the raw water side, fresh water permeates from the treated water side to the raw water side of the reverse osmosis membrane by the osmotic pressure of the raw water or condensed water (a positive osmotic phenomenon). Since even the raw water has an osmotic pressure of 27 $kg/cm^2$ (in the case of seawater), even if the hydraulic pressure of condensed water for flushing is 1 $kg/cm^2$, sufficient driving force for positive osmosis can be obtained. As a matter of course, the amount of the fresh water to be supplied may be an amount for compensating for an amount permeating to the raw water side. Here, as CL4, $Cl_2$ or $SO_2$ (in the case of a reverse osmosis membrane which is easily damaged by $Cl_2$) is used, and depending on the case, $CO_2$ (in the case where scales of $CaCO_3$ may be deposited) is further used in combination. Their amounts to be used are not particularly specified, but they may be used at saturated concentrations for the purpose of avoiding the complicacy of the operation. The place for addition may be the produced water-storing tank: 7, and when the capacity of said produced water-storing tank is too large, an exclusive tank may be provided and the chemical(s) may be added thereto. Also, an ejector may be provided on a line of conveying produced water backward, and a predetermined amount of the chemical(s) may be sucked in and mixed with produced water.

(2) Air washing

① Drainage

From the lower portion of the fiber layer: 64, air is made to flow in, and from the upper portion of the reverse osmosis membrane apparatus: 6 (the inlet of raw water—when raw water is made flow downward at the time of raw water supplying—), a part of water in said reverse osmosis membrane apparatus is drained with said air to form an air bubble layer in said reverse osmosis membrane apparatus. Even in this stage, a certain degree of a washing effect can be obtained. However, since the flow of air in the fiber layer: 64 is non-uniform, washing only in this stage is insufficient.

② Pressurization

The above drainage hole is closed, and supply of air is continued to make the inner space of the reverse osmosis membrane apparatus: 6 a pressurized state (about 2 $kg/cm^2$).

③ Discharge

After supply of air is stopped, a blow valve (not shown in the figures) provided at the lower portion of the reverse osmosis membrane apparatus: 6 is opened, water in said reverse osmosis membrane apparatus is discharged at a stretch to the outside of the system. The flowing direction of the water is downward, and due to produced water (which is always supplied to the treated water side of the reverse osmosis membrane apparatus: 6 even during the air washing step subsequent to the back washing step) oozing out from the inner portion of each fiber: 65, the surface of said fiber is in a state that the adhered particles are easily slid, so that a considerable amount of the adhered particles are removed and discharged by rapid flowing of discharging water.

④ Air washing

To the module of the reverse osmosis membrane apparatus: 6 which becomes empty, air is fed from the lower portion thereof (the outlet of condensed water) together with raw water or condensed water (which has been passed through a cartridge filter similarly as in the back washing step). The flowing of air in the fiber layer: 64 in this stage is uniform, and yet the water surface in the module is raised while it is trembled vigorously. Therefore, particles captured in the inner space of the fiber layer: 64 are easily peeled off. Also, during this stage, between water in the fiber layer: 64 and water in the core tube: 61, different in density is generated because of presence or absence of air bubbles to cause a circulating flow, which consequently helps the previously peeled particles to float. Here, the fed water flows out from the inlet of raw water similarly as in the above stage ① (drainage). In the apparatus of the present invention, the outer circumferential space: 67b is provided with spacers: 69 which can prevent a direct flow in the axis direction of the core tube: 61, i.e., in the upward and downward directions in said outer circumferential space, so that air does not blow preferentially through said outer circumferential space.

(3) Back washing

After the stages ② and ③ of the above step (2) (air washing) are repeated again, the above step (1)(back washing) is carried out again. This is to wash out the particles remaining in the system.

Utilizability in industry

The apparatus of the present invention extends vertically, so that particles which are peeled off in washing operation and remain in the system move gradually downward at the time of raw water supplying. As a result, a portion at which pressure loss is low always exists at the upper portion of the fiber layer, and increase in pressure loss as a whole becomes moderate. Further, even in the fiber layer, a downward flow is generated due to density to prevent choking of the upper portion and reduce concentration polarization, which is advantageous in the aspect of permeation of water. As a matter of course, there can directly be obtained great advantages including elongation of an operatable time because air washing can be carried out.

Specific advantages are that the cost of construction can be lowered to about 60% of that of the conventional system, and the amount of consumed power can be also lowered by about 10%. Further, the cost of fresh water produced by the system of the present invention is reduced to about 75% of that of the conventional system.

Based on presumption from the progress of increase in pressure loss, according to the method and the apparatus of the present invention, the lifetime of a membrane module is expected to become as long as 2 to 4 years without pretreatment, and a novel method for desalinating salts-containing water, which is abundant in simplicity and economy, can be provided.

I claim:

1. A method for desalinating salt-containing sea water or brackish water using a hollow fiber reverse osmosis membrane, which comprises using a vertically extending cylindrical reverse osmosis membrane apparatus, at the time of raw salt-containing water supplying, the raw water is supplied to said reverse osmosis membrane apparatus without pretreatment including filtration pretreatment to remove suspended solids and chlorination pretreatment, making said raw water flow from a core tube arranged along the center axis of said reverse osmosis membrane apparatus into a fiber layer of said reverse osmosis membrane apparatus through an inner circumferential space provided between an inner circumferential surface of said fiber layer, and making said raw water flow out through an outer circumferential space, which is an open space, provided between an outer circumferential surface of said fiber layer and an outer cylinder of said reverse osmosis membrane apparatus, wherein said inner circumferential space is an open space which is formed by an outer circumferential surface of said core tube; plural ribs are provided on the outer circumferential surface of said core tube so that they extend along the axis of said core tube and the inner circumferential surface of said fiber layer; raw water is supplied to said inner circumferential space through holes through which raw water can be passed together with particles contained therein, said holes being pierced locally at the upper portion and the lower portion of the wall of said core tube, whereby not only raw water but also particles contained therein are introduced into said fiber layer uniformly.

2. The method according to claim 1, wherein water in the above outer circumferential space is restricted not to flow in the upward and downward directions linearly in said outer circumferential space.

3. The method according to claim 2, wherein said method includes a step that after raw water supplying is stopped, produced water in which $Cl_2$ or $SO_2$ is dissolved or produced water in which $CO_2$ together with $Cl_2$ or $SO_2$ are dissolved is supplied to the treated water side of the reverse osmosis membrane in a direction reverse to the direction at the time of raw water supplying, while condensed water is supplied to the raw water side of the reverse osmosis membrane in a direction reverse to the direction at the time of raw water supplying, whereby microorganisms living in the vicinity of the surface at the raw water side of said fiber are firstly deteriorated and then killed by said dissolved gaseous substances which are carried on the stream of the produced water, which is made to permeate the reverse osmosis membrane from the treated side to the raw water side thereof by the positive osmotic phenomenon, and adhesion to the membrane surface of a gel layer which is formed by accumulation of fine particles entering into said fiber layer is peeled off from said membrane surface and carried away with the condensed water.

4. The method according to claim 3, wherein said method includes a step subsequent to the above step that after water retained in the reverse osmosis membrane apparatus is drained, while condensed water is supplied to the raw water side of the reverse osmosis membrane in a direction reverse to the direction at the time of raw water supplying, air is fed from the lower portion of the fiber layer, whereby the vicinity of the water surface which moves upward in the module of the reverse osmosis membrane apparatus becomes a gas-liquid mixed stream which flows vigorously, and said fiber layer pulsates, and therefore, the particles adhered to the surface of each fiber in said fiber layer are peeled off from said fiber upward, in order and easily.

5. The method according to claim 1, wherein said method includes a step that after supplying raw water is stopped, produced water in which $Cl_2$ or $SO_2$ is dissolved or produced water in which $CO_2$ together with $Cl_2$ or $SO_2$ are dissolved is supplied to the treated water side of the reverse osmosis membrane in a direction reverse to the direction at the time of raw water supplying while condensed water is supplied to the raw water side of the reverse osmosis membrane in a direction reverse to the direction at the time of raw water supplying, whereby microorganisms living in the vicinity of the surface at the raw water side of said fiber are firstly deteriorated and then killed by said dissolved gaseous substances which are carried on the stream of the produced water, which is made to permeate the reverse osmosis membrane from the treated side to the raw water side thereof by the positive osmotic phenomenon, and adhesion to the membrane surface of a gel layer which is formed by accumulation of fine particles entering into said fiber layer is peeled off from said membrane surface and carried away with the condensed water.

6. The method according to claim 5, wherein said method includes a step subsequent to the above step that after water retained in the reverse osmosis membrane apparatus is drained, while condensed water is supplied to the raw water side of the reverse osmosis membrane in a direction reverse to the direction at the time of raw water supplying, air is fed from the lower portion of the fiber layer, whereby the vicinity of the water surface which moves upward in the module of the reverse osmosis membrane apparatus becomes a gas-liquid mixed stream which flows vigorously, and said fiber layer pulsates, and therefore, the particles adhered to the surface of each fiber in said fiber layer are peeled off from said fiber upward, in order and easily.

7. A hollow fiber reverse osmosis membrane apparatus used for a system for desalinating salt-containing sea water or brackish water, in which at the time of raw water supplying, raw water is supplied to the reverse osmosis membrane apparatus without pretreatment including filtration pretreatment to remove suspended solids and chlorination pretreatment; and at the time of washing of the apparatus, produced water in which $Cl_2$ or $SO_2$ is dissolved or produced water in which $CO_2$ together with $Cl_2$ or $SO_2$ are dissolved is supplied to the treated water side of the reverse osmosis membrane apparatus, while condensed water is supplied to the raw water side in the direction reverse to the direction at the time of raw water supplying, which comprises, along the center axis of said reverse osmosis membrane apparatus having a vertically extending cylindrical shape, a core tube having plural ribs arranged on an outer surface thereof so that they extend in said center axis direction, and holes through which water can be passed together with particles contained therein, pierced locally at the upper portion and the lower portion of the wall thereof, thereby forming an inner circumferential space in which raw water can move in the axis direction together with particles contained therein, which is defined by the outer circumferential surface of a fiber layer of said reverse osmosis membrane apparatus and which is an open space, and on the other hand, an outer circumferential space which is a substantially open space where condensed water can move in said center axis direction and has at least two spacers arranged at predetermined intervals in said center axis direction so that straight flowing of condensed water or a mixed fluid of condensed water and air in said space can be interrupted, formed between an outer circumferential surface of said fiber layer and an outer cylinder of said reverse osmosis membrane apparatus.

* * * * *